United States Patent [19]

Shimomura et al.

[11] Patent Number: 5,510,818
[45] Date of Patent: Apr. 23, 1996

[54] TRANSFER-MOLDING RESIN COMPOSITION FOR USE TO MANUFACTURE INK JET RECORDING HEAD, AND INK JET RECORDING HEAD MANUFACTURED BY USING THE SAME

[75] Inventors: Akihiko Shimomura; Keiichi Murai, both of Yokohama; Shigeo Toganoh, Tokyo, all of Japan

[73] Assignee: Canon Kabushiki Kaisha, Tokyo, Japan

[21] Appl. No.: 969,376

[22] Filed: Oct. 30, 1992

[30] Foreign Application Priority Data

Oct. 31, 1991 [JP] Japan .................................. 3-286273
Jun. 25, 1992 [JP] Japan .................................. 4-167796
Jun. 25, 1992 [JP] Japan .................................. 4-167797
Jun. 25, 1992 [JP] Japan .................................. 4-167798

[51] Int. Cl.$^6$ ...................................................... G01D 15/16
[52] U.S. Cl. ................................................................. 347/65
[58] Field of Search ........................................ 347/63, 71, 65

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,689,640 | 8/1987 | Shimomura | 346/140 R |
| 4,723,129 | 2/1988 | Endo et al. | 346/1.1 |
| 4,740,796 | 4/1988 | Endo et al. | 346/1.1 |
| 4,803,543 | 2/1989 | Inayoshi et al. | 357/72 |
| 5,150,132 | 9/1992 | Shimomura et al. | 347/65 |
| 5,237,342 | 8/1993 | Saikawa et al. | 347/65 |
| 5,331,344 | 7/1994 | Miyagawa et al. | 347/63 |
| 5,334,999 | 8/1994 | Kashiwazaki et al. | 347/65 |

FOREIGN PATENT DOCUMENTS

| | | |
|---|---|---|
| 158915 | 10/1985 | European Pat. Off. . |
| 54-56847 | 5/1979 | Japan . |
| 56-072963 | 6/1981 | Japan . |
| 59-123670 | 7/1984 | Japan . |
| 59-138461 | 8/1984 | Japan . |
| 60-71260 | 4/1985 | Japan . |
| 61-15497 | 1/1986 | Japan . |
| 61-125852 | 6/1986 | Japan . |
| 61-223024 | 10/1986 | Japan . |
| 62-253457 | 11/1987 | Japan . |
| 1259959 | 10/1989 | Japan . |
| 2168635 | 8/1990 | Japan . |
| 4090356 | 3/1992 | Japan . |
| 4090355 | 3/1992 | Japan . |

*Primary Examiner*—Benjamin R. Fuller
*Assistant Examiner*—Valerie Ann Lund
*Attorney, Agent, or Firm*—Fitzpatrick, Cella, Harper & Scinto

[57] ABSTRACT

An ink jet recording head having a fluid passage constituted by forming, on a substrate, an outer frame made of a hardened resin obtained by transfer molding, wherein a transfer-molding resin composition which is the material of the hardened resin is composed of an epoxy resin, a hardening agent, an agent for enhancing hardening and a filler, and the content of the filler is ranged from 0.5 to 17.0 wt. %.

18 Claims, 5 Drawing Sheets

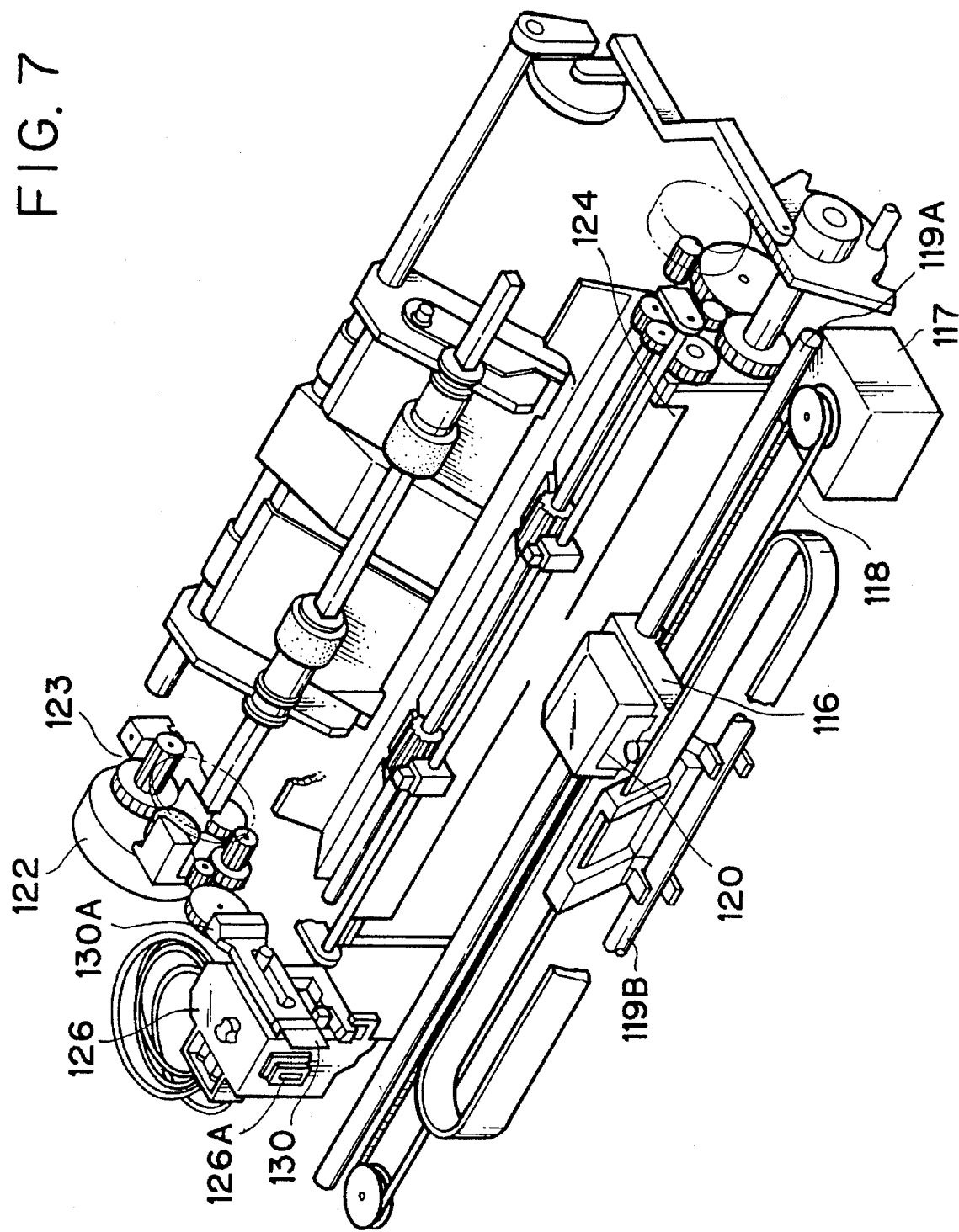

TRANSFER-MOLDING RESIN COMPOSITION FOR USE TO MANUFACTURE INK JET RECORDING HEAD, AND INK JET RECORDING HEAD MANUFACTURED BY USING THE SAME

BACKGROUND OF THE INVENTION

1. Field of the Invention

The present invention relates to a method of manufacturing an ink jet recording head, and, more particularly, to a selected transfer-molding resin composition suitable to manufacture a recording head by utilizing a transfer molding method, and to an ink jet recording head manufactured by using the aforesaid resin composition.

2. Related Background Art

An ink jet recording head (hereinafter called a "recording head") for use in an ink jet recording method ordinarily has ink discharge ports from which ink is discharged, a fluid chamber for storing ink to be supplied to the discharge ports, a fluid passage which connects the discharge ports and the fluid chamber to one another, energy generating devices disposed in a portion of the fluid passage and arranged to discharge energy for discharging ink, and an ink supply port through which ink is supplied to the fluid chamber from outside.

The conventional recording head has been manufactured anyone of the following methods.

(1) A method in which a first substrate having energy generating devices disposd thereon is used, recesses to be utilized to form the ink discharge ports, the fluid passage and the fluid chamber, and the ink supply port to connect the fluid chamber and the outside to each other are respectively formed in a second substrate made of glass or metal by machining means such as cutting or etching, and then the first and the second substrate are bonded to each other with an adhesive while aligning the energy generating devices and the fluid passage with each other.

(2) A method in which a positive-type or a negative-type photosensitive dry film is applied to a first substrate having energy generating devices formed thereon and made of glass or the like, the pattern of the photosensitive dry film corresponding to the ink discharge ports, the fluid passage and the fluid chamber is masked or allowed to appear outside so as to be exposed to light, and is developed so that a solid layer of the pattern corresponding to the discharge ports, the fluid passage and the fluid chamber is formed on the first substrate. A liquid hardening material, to which a hardening agent is mixed, is applied to the solid layer and to the first substrate to have a proper thickness, and the first substrate is allowed to stand at a predetermined temperature for a long time so that the hardening material is hardened. Then, the first substrate on which the hardening material has been hardened, is cut at a position at which the ink discharge port will be formed, and the end surface of the solid layer is allowed to appear outside, and the first substrate is dipped in a solution which dissolves the solid layer so that the solid layer is dissolved and removed from the first substrate, on which the hardening material has been hardened, and spaces for forming the fluid passage and the fluid chamber are formed (refer to Japanese Patent Application Laid-Open No. 61-15497).

(3) A method in which a positive-type or a negative-type photosensitive dry film is applied to a first substrate having energy generating devices thereon, the pattern of the photosensitive dry film corresponding to the ink discharge ports, the fluid passage and the fluid chamber is masked or allowed to appear outside so as to be exposed to light, and is developed so that the solid layer of the pattern corresponding to the discharge ports, the fluid passage and the fluid chamber is formed on the first substrate. An active-energy-ray hardening material, which is hardened by active energy rays, is applied to the solid layer and the first substrate to have a proper thickness, a second substrate through which the active energy rays are able to transmit and which has a recess for forming a portion of the fluid chamber and the ink supply port are formed is bonded on the active energy ray hardening material while aligning the recess to the position at which the fluid chamber will be formed so that a stacked member is formed. Then, the second substrate is masked in such a manner that a portion of the active energy ray hardening material, in which the liquid chamber will be formed, is covered so as to irradiate the active energy ray hardening material with the active energy rays through the second substrate so that the active energy ray hardening material is hardened. Then, the stacked member, on which the active energy ray hardening material has been hardened, is cut at a position at which the ink discharge port will be formed, and the end surface of the solid layer is allowed to appear outside, and the stacked member is dipped in a solution which dissolves the solid layer and the non-hardened active energy ray hardening material so that the solid layer and the non-hardened active energy hardening material are dissolved and removed from the stacked member, and spaces for forming the fluid passage and the fluid chamber are formed (refer to Japanese Patent Application Laid-Open No. 62-253457).

(4) A transfer molding manufacturing method has been disclosed recently which is arranged in such a manner that a molding resin is injected into a mold having cavities and projections for forming the fluid passage, the fluid chamber, the ink supply port and the ceiling board, and the molding resin ms hardened and molded at a predetermined injection pressure and molding temperature. After the resin has been molded, the discharge surface is cut and ground if necessary, and the solid layer is dissolved and removed by a proper solvent so that the ink chamber including the ink supply port, the fluid passage and the ink discharge port are formed.

The transfer molding method (4) of the aforesaid conventional methods of manufacturing a recording head enables the process for precisely aligning the two substrates and bonding them to each other to be eliminated. Therefore, precise, reliable, and low cost ink jet recording heads, which can easily be mass-produced, can be manufactured by simple processes while decreasing the number of the processes. However, the manufactured recording head sometimes encounters a defect because thermal stress generated in the recording head at the time of the transfer molding process due to the contraction of the resin at the time of hardening and due to the difference in the expansion coefficient between the resin and the substrate causes the substrate to be broken at the time of the cutting process performed for the purpose of forming the discharge port and causes the resin and the substrate to be separated from each other. If the recording head is allowed to stand in a high temperature and high humidity condition for a long time, the interface between the resin and the substrate can be separated. It can be considered that the reason for this lies in that the adhesion between the resin and the substrate deteriorates due to the thermal stress generated at the time of manufacturing the recording head and due to the ink resistance of the resin. If the separate takes place in the interface between the resin and the substrate, pressure waves propagate to the adjacent nozzle while affecting the ink discharge.

SUMMARY OF THE INVENTION

Accordingly, an object of the present invention is to provide an ink jet recording head freed from defects in its manufacturing process, and freed from separation in the portion including the interface between the resin and the substrate thereof even if it is allowed to stand in a high temperature and high humidity atmosphere for a long time, and to a transfer-molding resin composition for use to manufacture the recording head.

It should be noted that thermal stress σ is determined by the following equation:

$$\sigma = k \int_{T0}^{Tg} E(t) \Delta\alpha(t) dt$$

where k: constant

E (t): elastic modulus of resin

Δα (t): difference between the linear expansion coefficient of substrate and that of resin Tg: glass transition point of resin T0: room temperature Therefore, the thermal stress can be reduced in the aforesaid equation by anyone of the following three methods.
(1) The elastic modulus of the resin is reduced.
(2) The difference between the expansion coefficient of the substrate and that of the resin is reduced.
(3) The difference in the temperature from the room temperature is decreased by lowering the glass transition point. The resin composition according to the present invention is able to satisfy each or a plurality of the aforesaid methods. Then, the resin composition, which can be used in the transfer molding method, will now be described.

The resin composition, which is made to be a hardened resin due to the transfer molding process, comprises an epoxy resin, a hardening agent, an agent for enhancing hardening, and a filler.

The epoxy resin is not limited particularly and therefore it may be selected from known resins. For example, it may be a bisphenol A-type epoxy resin, a bisphenol F-type epoxy resin, a phenolnovolak epoxy resin, an alicyclic epoxy resin, an aliphatic epoxy rein, a glycidyl ether epoxy resin or the like, or their combinations.

As the hardening agent, the following acid anhydride may be employed: phthalic anhydride, maleic anhydride, trimelitic anhydride, pyromelitic anhydride, hexahydrophthalic anhydride, tetrahydrophthalic anhydride, methylnadic anhydride, nadic anhydride, and glutaric anhydride. Also anyone of the following amino-type hardening agents may be employed: methaphenylene diamine, dimethylphenylmethane, diaminodiphenylsulfon, m-xylenediamine, tetraethylenependamine, diethylamine, or propylamine, or the like.

The agent for enhancing hardening may be tertiary amino, anyone of imidazols, carboxylic metal salts, or phosphorus compounds.

The filler may be molten and milled silica, or spheroidal silica silicon resin filler.

The transfer-molding epoxy resin composition may contain known additives such as a coloring-prevention agent, a deterioration prevention agent, or a mold releasing agent.

A preferable composition ratio of the resin composition according to the present invention will now be described.

The epoxy resin may composed of 80 parts of Epicoat 1001 (trade name of Yuka Shell), 20 parts of triglycidyl isocyanate (manufactured by Nissan Kagaku), 55 parts of tetrahydrophthalic anhydride (manufactured by Hitachi Kasei) serving as the hardening agent, 1 part of curing catalyst (trade name 2E4MZ), and a spheroidal filler (trade name FB-35 manufactured by Denki Kagaku Kogyo and having a mean particle size of 12 μm) by 2.5% of the overall weight.

BRIEF DESCRIPTION OF THE DRAWINGS

FIG. 7 is a perspective view which illustrates an example of the structure of a recording apparatus having the ink jet recording head according to the present invention.

DESCRIPTION OF THE PREFERRED EMBODIMENTS

A method of manufacturing an ink jet recording head according to the present invention will now be described.

Figure 1:
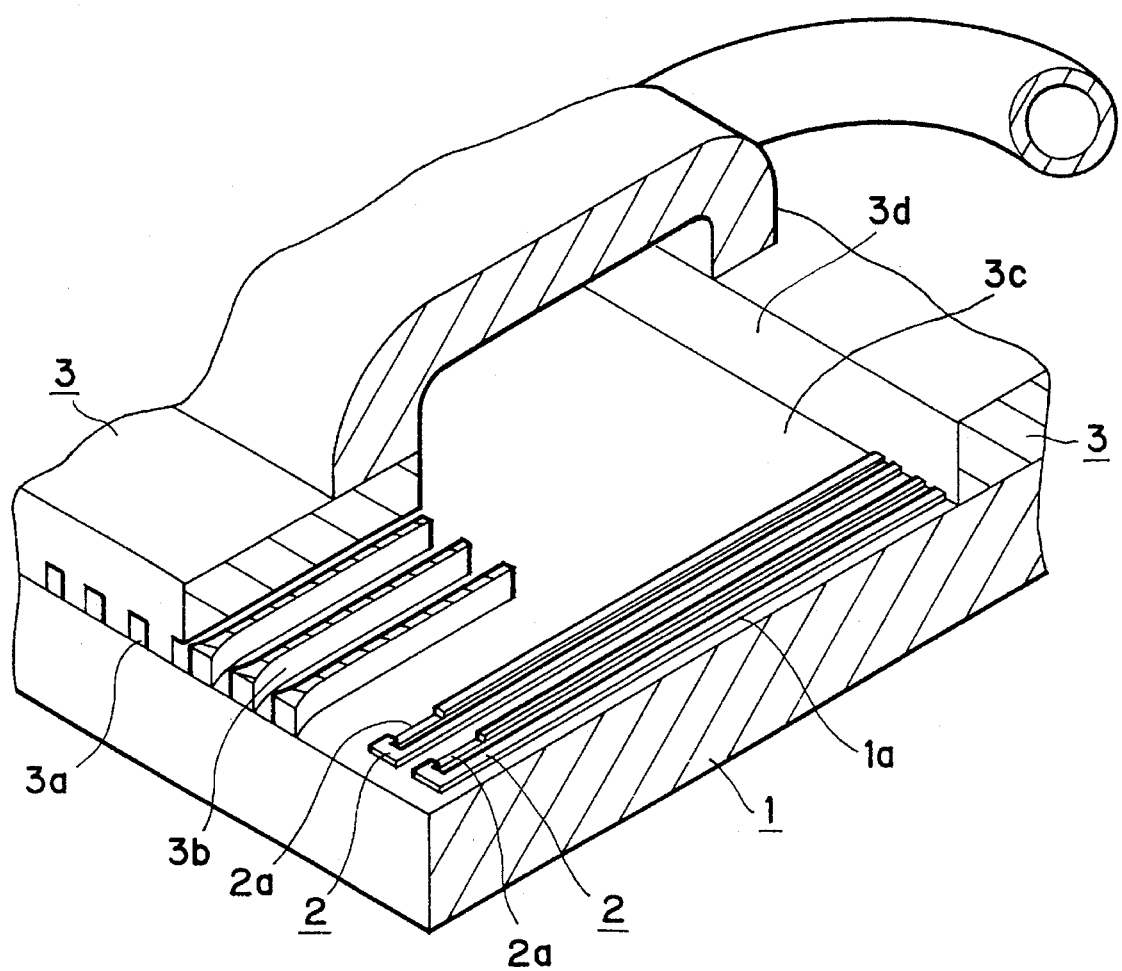
FIG. 1 is a partial and perspective cross sectional view which illustrates an example of an ink jet recording head according to the present invention.

FIG. 1 is a perspective view which illustrates an example of the structure of the ink jet recording head according to the present invention. Energy generating devices 2a and electrodes 2 are disposed on a substrate 1 so that a device surface 1a is constituted. The device surface 1a has an outer frame 3 formed thereon, the outer frame 3 having ink discharge parts 3a, fluid passages 3b and a fluid chamber 3c made of hardened resin.

As the substrate, a known substrate such as silicon wafer or the like may be used.

As the energy generating device, a known electricity-to-heat conversion member may be employed.

The most effective way to discharge ink is to employ a film boiling method.

FIG. 7 is a perspective view which illustrates the shape of an ink jet recording apparatus (IJRA) to which the recording head according to the present invention is, as an ink jet head cartridge (IJC), fastened.

Referring to FIG. 7, reference numeral 120 represents the ink jet head cartridge (IJC), having a nozzle group which are positioned to face the recording surface of recording paper moved to a position on a platen 124 so as to discharge ink to the recording surface. Reference numeral 116 represents a carriage HC for holding the IJC 120, the carriadge HC being connected to a portion of a drive belt 118 which transmits the rotational force of a drive motor 117 so that the carriage HC is able to slide along two guide shafts 119A and 119B running parallel to each other, and therefore the carriadge HC is able to reciprocate for the overall length of the recording paper.

Reference numeral 126 represents a head recovery device which is disposed at an extrimity of the passage through which the IJC 120 is moved, for example, it is disposed at a position at which it faces the home position. The head recovery device 126 is operated by the driving force of a motor 122 via a transmission mechanism 23 so that capping of the IJC 120 is performed. In relation to the operation of capping the IJC 120 performed by a capping portion 126A of the head recovery device 126, ink is sucked by an employed sucking means disposed in the head recovery device 126, or ink is sent with pressure by a selected pressurizing means disposed in an ink supply passage through which ink is supplied to the IJC 120. As a result, ink is forcibly discharged through a discharge port so that the discharge recovery operation is performed, for instance, a portion of ink in the nozzle, the viscosity of which has been raised, is removed. As a result of the capping operation performed at the time of the completion of the recording operation, the IJC 120 can be protected.

Reference numeral 130 represents a blade disposed on the side surface of the head recovery device 126 and serving as a wiping member made of silicon rubber. The blade 131 is held by a blade holding member 131A in a cantilever manner, and is operated by the motor 122 and the transmission mechanism 123 similarly to the head recovery device 126 so that the blade 130 can be brought into contact with the discharging surface of the IJC 120. As a result, the blade 130 can be allowed to project into the passage, through which the IJC 120 is moved, at a proper timing during the recording operation performed by the IJC 120 or after the discharge recovery process has been performed by using the head recovery device 126. Hence, condensed dew, a wet portion or, dust present on the discharging surface of the IJC 120 can be wiped out in synchronization with the movement of the IJC 120.

Figure 2:
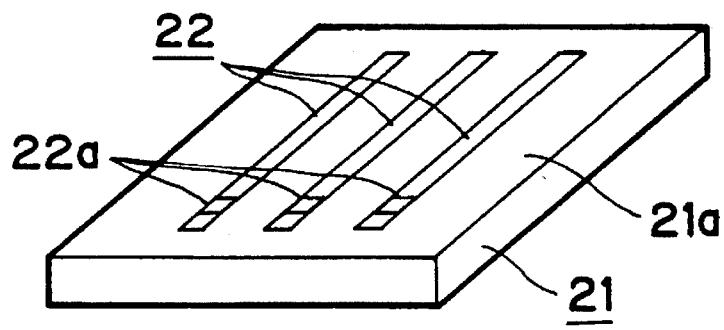
FIG. 2 is a perspective view which illustrates the structure of the device surface of the substrate of the ink jet recording head according to the present invention.

First, electricity-to-heat conversion members 22a serving as energy generating members are disposed on a substrate 21 made of the aforesaid material. Then, control signal receiving electrodes 22 are disposed to be aligned with the electricity-to-heat conversion members 22a so that a device surface 21a is formed (see FIG. 2). The electricity-to-heat conversion members 22a and the control signal receiving electrodes 22 are formed on the substrate 21 by a semiconductor process such as an evaporation method, a sputtering method and an etching method.

Figure 3:
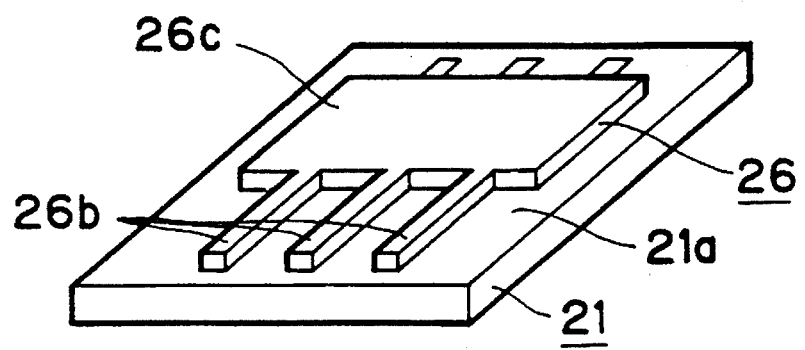
FIG. 3 is a perspective view which illustrates the ink jet recording head according to the present invention and having a solid layer formed on the surface of the substrate thereof during the manufacturing process.

Then, a solid layer 26 having a fluid passage pattern composed of fluid passages 26b and a fluid chamber 26c and formed on the device surface 21a in such a manner that the fluid passage pattern corresponds to the electricity-to-heat conversion members (see FIG. 3).

As the solid layer, a positive resist for precise plating or the like may be used.

Figure 4:
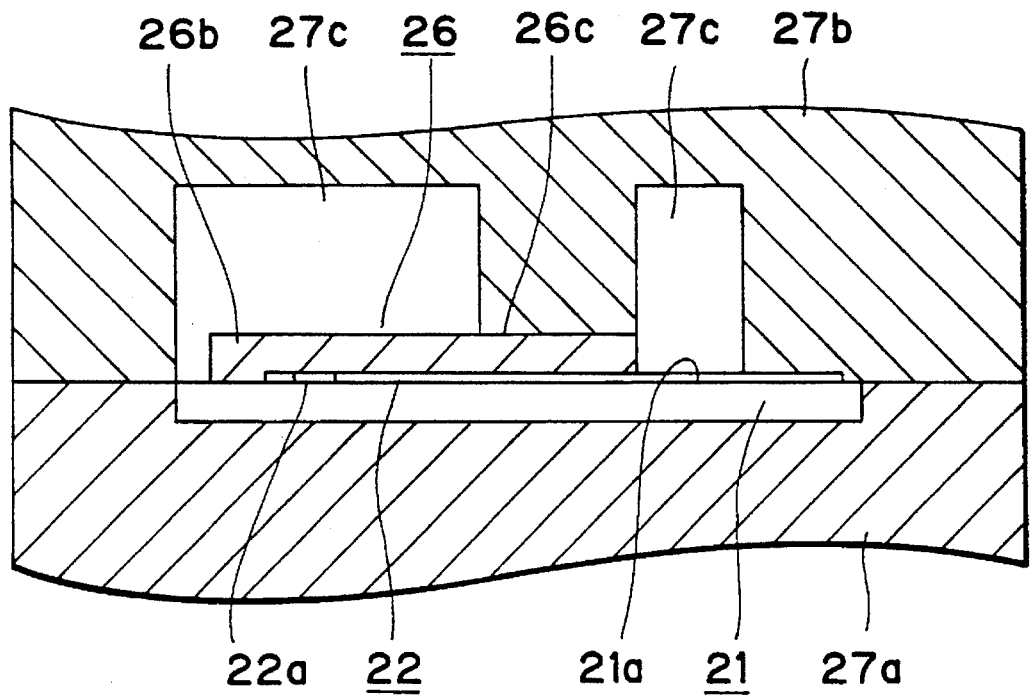
FIG. 4 illustrates a process in which the substrate of the recording head is placed in a mold for the transfer molding process.

Then, the substrate 21 having the device surface 2a is interposed between an upper transfer molding die 27b having a projecting portion, which will be formed into the fluid chamber, and a lower transfer molding die 27a. Then, the aforesaid resin composition is injected into a cavity portion 27c so that an outer frame 29 is formed by transfer molding (FIG. 4).

Then, the transfer molding method will now be described.

The transfer molding process adaptable to this embodiment may be performed under ordinary molding conditions by an ordinary manufacturing method which is arranged in such a manner that a substrate, on which a solid layer is formed, is inserted into an upper die or a lower die having a cavity provided with a proper runner, a gate and an air discharge structure, and the dies are clamped. The outer frame is made of the resin composition for the transfer molding process according to the present invention. The resin is previously heated to a temperature ranged from 60° C. to 90° C., is injected at a pressure ranged from 20 to 140 Kgf/cm$^2$, is molded at a temperature ranged from 100° to 180° C., and is hardened under the pressure for 1 to 10 minutes, and is cured after the molding process has been completed. Each of the most suitable value of the aforesaid conditions may be determined after the moldability (the shape, bubbles in the resin, burrs, and flash) has been confirmed. In general, the time taken for the resin to be hardened can be shorted by raising the molding temperature. Furthermore, higher the injection pressure, the shape can be further stabled and the generation of the bubbles can be prevented. However, excessively high pressure will damage the product and cause the resin to encounter a problem of the burrs and the flash. The necessity of performing the post-curing process continuously from the molding process can be eliminated, and it may be performed at a proper moment during the process of manufacturing the product. The post-curing process may, of course, be omitted if necessary.

In order to smoothly separate the molded product from the die, a parting agent for the molding die may be used.

Figure 5:
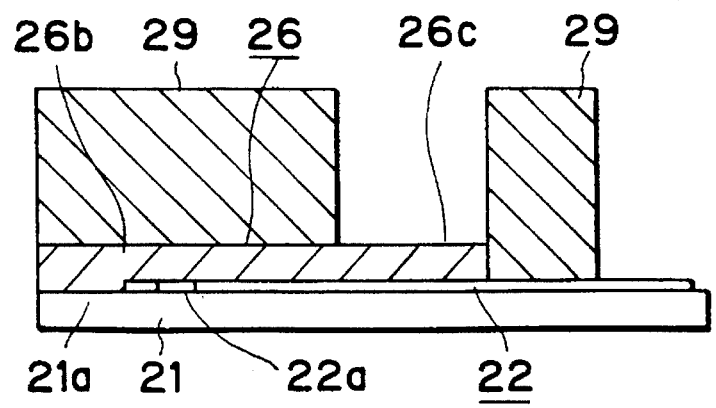
FIG. 5 is a side elevational cross sectional view which illustrates the structure of the ink jet recording head in a process in which the transfer molding process has been completed.

As a result of performing the aforesaid molding process, the outer frame 29 made of the hardened resin composition according to the present invention is formed on the substrate (see FIG. 5).

Figure 6:
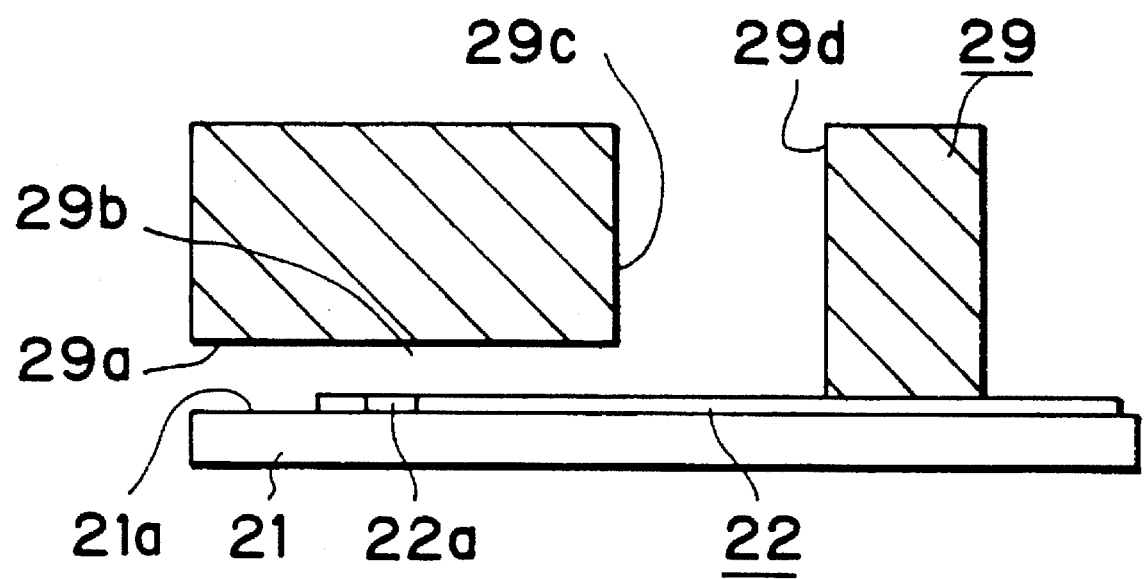
FIG. 6 is a side elevational cross sectional view which illustrates the ink jet recording head according to the present invention and having a fluid passage, a fluid chamber and an ink supply port formed after the solid layer has been removed.

After the transfer molding process has been completed, the solid layer is removed so that the recording head according to the present invention is manufactured (see FIG. 6). Referring to FIG. 6, reference numeral 29a represents an ink discharge port, 29b represents a fluid passage, 29c represents a fluid chamber and 29d represents an ink supply port.

The solid layer can be removed by a method in which caustic soda waster solution is used in the case where the solid layer is made of the positive resist or a method in which an organic solution such as acetone is used in the case where the solid layer is made of the positive resist for plating. The solution is not limited to the aforesaid type if it does not attack the material of the outer frame. If enhancing means such as stirring the solution and/or supersonic waves are further employed, the solid layer can, of course, be efficiently removed.

Since the ink discharging characteristics are sometimes changed depending upon the length of the ink passage, the discharge port portion may be cut at a predetermined position in order to determine the optimum position.

The discharge port portion is cut by a known diesing method in which the wafer is cut. The solid layer can be removed after the discharge port portion has been cut, causing an advantage to be obtained in that a problem that the ink passage is blocked by cut tip or dust can be overcome because the solid layer is present in the ink passage which is an important portion of the ink jet recording head, and another advantage to be obtained in that the solid layer can easily be removed because the ink passage is shortened.

The ink jet recording head is then subjected to various cleaning processes and surface treatments, and auxiliary parts such as a filter are fastened, so that the final product is manufactured. However, their descriptions are omitted here because they do not directly relate to the object of the present invention.

Then, the present invention will now be described specifically.

Among the aforesaid methods capable of reducing the thermal stress, the difference between the linear expansion coefficient of the substrate and that of the resin can be decreased by reducing the linear expansion coefficient of the resin so as to be approached to the linear expansion coefficient of the substrate because the linear expansion coefficient of the substrate is generally smaller than that of the resin. The linear expansion coefficient of the resin can be reduced by a method in which an inorganic filler is mixed to the transfer-molding resin. By mixing the inorganic filler, another effect of improving the ink resistance can be obtained. However, the increase in the quantity of the mixed filler will undesirably enlarge the elastic modulus of the resin although the linear expansion coefficient of the resin can be reduced. Therefore, the inventor of the present invention has found a fact from studies that the elastic modulus of the resin is extremely enlarged due to the friction of the fillers if the quantity of the mixed filler exceeds 17% and therefore the thermal stress is enlarged. If the quantity of the mixed filler is smaller than 0.5% the linear expansion is substantially eliminated and the ink resisting effect obtainable by adding the filler is substantially lost. Therefore, the thermal stress can be reduced by making the ratio of the mixture of the filler with the transfer-molding resin to be 0.5% to 17%. Furthermore, combination of a transparent epoxy resin and a filler having a refraction factor which approximates that of the resin will enable an effect to be obtained in that a defect of the substrate and a foreign material in the nozzle can be observed through the molded resin.

Furthermore, the inventors of the present invention have found a fact that the method of reducing the thermal stress by lowering the elastic modulus of the resin may be realized by using a resin composition obtained by mixing an epoxy resin, which is fluid at the room temperature, with a B-stage epoxy resin composition composed of an epoxy resin, a hardening material and an agent for enhancing hardening. The term "B-stage" used here is meant a state where the epoxy resin is semi-hardened. In particular, the enlargement of the quantity of the epoxy main component contained by the aforesaid transfer-molding resin than the equivalent of the hardening agent will apparently lower the cross-linking density of the hardened material, causing the elastic modulus to be lowered. Furthermore, use of the aforesaid resin composition will cause the epoxy resin, which has excellent flowability and which is fluid at the room temperature, to flow into small projections and pits of the substrate at the time of the transfer molding process to become an anchor. Hence, the adhesion can be improved. Furthermore, the hardened material can be made fine and therefor the ink resistance can be improved because the physical gaps in the B-stage epoxy resin composition, which flows into the mold while being formed into gell, can be plugged by the epoxy resin which is fluid at the room temperature.

Another fact was found that use of a resin composition containing an epoxy resin, the main chain of which is polysulfide skeleton, is able to lower the elastic modulus of the resin, the resin composition being used as the transfer-molding resin composition. It can be considered that the reason for this lies in that the water resistance and the flexibility of the polysulfide structure deteriorate the ink resistance and the elastic modulus of the hardened resin.

Then, the method of reducing the thermal stress by lowering the glass transition joint of the resin will now be described.

The thermal stress of the transfer-molding resin is rapidly enlarged in the vicinity of glass transition point Tg during a period in which the transfer-molding resin is cooled from the temperature at which it is molded to the room temperature, and then the thermal stress is enlarged in proportion to the difference in the temperature from the room temperature. That is, the thermal stress can be reduced by reducing the difference in the temperature between the glass transition point of the resin and the room temperature. Therefore, the glass transition point of the resin is lowered. A fact was found that a satisfactory effect can be obtained to reduce the thermal stress if Tg of the transfer-molding resin is 140° or lower although the glass transition point of the transfer-molding resin for use in a semiconductor is usually about 170° C. Another fact was found that satisfactory reliability of the ink jet recording head can be realized if Tg is 60° C. or higher depending upon a result of consideration made about the environment in which the resin is used, the heat resistance: in the manufacturing process, the reliability of the manufactured ink jet recording head and the stability of the quality of the printed image.

Although anyone of the aforesaid resin compositions according to the present invention will enable a satisfactory effect to be obtained, a further excellent effect can, of course, be obtained if they are combined to each other.

Then, the present invention will now be described in detail with reference to examples.

First, an example in which the inorganic filler is mixed with the transfer-molding resin will now be described.

EXAMPLE 1

First, the following materials were heated and melted so as to be mixed with one another: 80 parts of Epicoat 1001 (manufactured by Yuka Shell) serving as the epoxy resin, 20 parts of triglycidyl isocyanate (manufactured by Nissan Kagaku), 55 parts of tetrahydrophthalic anhydrice (manufactured by Hitachi Kasei) serving as the hardening agent, 1 part of curing catalyst (trade name 2E4MZ), and a spheroidal filler (trade name FB-35 manufactured by Denki Kagaku Kogyo and having a mean particle size of 12 μm) by 2.5% by weight of the overall weight. Then, the mixed materials were cooled, crushed and made to be a tablet so that a tablet of the transfer-holding epoxy resin composition was obtained.

Then, the outer case made of the hardened resin was formed by transfer molding by using the aforesaid tablet on the substrate on which the device surface had been formed. The molding conditions were as follows: the previously heating temperature was 85° C., the injection pressure was 40 Kgf/cm$^2$ the molding temperature was 130° C., and the time which takes for the resin to be hardened under the maintained pressure was 8 minutes.

After molding has been completed, the ink jet recording head to be manufactured was cut at the position at which the ink discharge port would be formed, and then the solid layer was dissolved And removed, so that the recording head according to the present invention was obtained.

Twenty recording heads were manufactured by the aforesaid process in order to examine the proportion defective. Furthermore, the proportion defective was examined after the twenty recording heads had been allowed to stand at 60° C. and at a humidity of 90%. The results of the examinations are shown in Table 1.

The quantity of expansion of the hardened resin was examined to evaluate the ink resistance after it had been dipped in PCT filled with ink (Canon Bubble Jet Printer BJ330 manufactured by Canon), the temperature of which was 120° C., for 10 hours. The results are also shown in Table 1.

COMPARATIVE EXAMPLE 1

Recording heads were manufactured similarly to Example 1 except for the content of the spheroidal silica filler was made to be 0.4% so that proportion defective and the ink resistance were examined. The results are shown in Table 1.

EXAMPLE 2

Recording heads were manufactured similarly to Example 1 except for the content of the spheroidal silica filler was made to be 17.0% so that proportion defective and the ink resistance were examined. The results are shown in Table 1.

COMPARATIVE EXAMPLE 2

Recording heads were manufactured similarly to Example 1 except for the content of the spheroidal silica filler was made to be 18.0% so that proportion defective and the ink resistance were examined. The results are shown in Table 1.

EXAMPLE 3

Recording heads were manufactured similarly to Example 1 except for the content of the spheroidal silica filler was made to be 0.5% so that proportion defective and the ink resistance were examined. The results are shown in Table 1.

TABLE 1

| Transfer-molding resin composition | Result of inspection of initial defeats | Result of inspection of defects after the samples were allowed to stand at 60° C. and 90% for 720 hours | Quantity of expansion after the samples were dipped in 120° C.-ink for 10 hours |
|---|---|---|---|
| Example 1 | All of 20 heads were freed from defects | One of the 20 heads encountered a problem of the quality of the printed image due to separation of the resin | 3.75% |
| Comparative Example 1 | All of the 20 heads were freed from defects | Seven of the 20 heads encountered a problem of the quality of the printed image due to separation of the resin | 4.15% |
| Example 2 | One of the 20 heads encountered a defect of breakage of the substrate at the time of cutting | One of the 20 heads encountered a problem of the quality of the printed image due to separation of the resin | 2.78% |
| Comparative Example 2 | Four of the 20 heads encountered a defect of breakage of the substrate at the time of cutting | Nine of the 20 heads encountered a problem of the quality of the printed image due to separation of the resin | 2.28% |
| Example 3 | All of the 20 heads were freed from defects | One of the 20 heads encountered a problem of the quality of the printed image due to separation of the resin | 3.11% |

Then, examples will be described in which the resin composition is used which is obtained by mixing the epoxy resin, which is fluid at the room temperature, with the B-stage epoxy resin composition composed of the epoxy resin, the hardening agent, and the agent for enhancing hardening.

EXAMPLE 4

An epoxy resin composed of 80 parts of Epicoat 1001 (manufactured by Yuka Shell) and 20 parts of triglycidyl isocyanate (manufactured by Nissan Kagaku), 55 parts of tetrahydrophthalic anhydrice (manufactured by Hitachi Kasei) serving as the hardening agent, and 1 part of curing catalyst 2E4MZ were heated and melted so as to be mixed with one another. Then, the hardening reaction of the epoxy resin was allowed to proceed so that the B-stage epoxy resin, which had been gelled at 130° C. for 40 seconds, was prepared. The resin thus-obtained was cooled and crushed, and 30 parts of an epoxy resin (Epicoat 828 manufactured by Yuka Shell), which was fluid at the room temperature, were added and the tablet making process was performed so that an epoxy resin composition tablet was obtained.

Then, the aforesaid tablet was used so that an outer frame made of a hardened resin was formed by the transfer molding on the substrate on which the device surface had been previously formed. The molding conditions were as follows: the previously heating temperature was 85° C., the injection pressure was 40 Kgf/cm$^2$ the molding temperature was 130° C., and the time, in which the resin was hardened under a predetermined pressure, was 8 minutes.

Simultaneously, samples were manufactured in order to measure the physical properties of the hardened resin.

After molding had been completed, the ink jet recording head to be manufactured was cut at the position at which the ink discharge port would be formed, and then the solid layer was dissolved and removed, so that the recording head according to the present invention was obtained.

Twenty recording heads were manufactured.

The ink jet recording heads thus-obtained were respectively allowed to stand in an atmosphere, the temperature of which was 60° C. and the humidity of which was 90% for 360 hours, and in a dry atmosphere, the temperature of which was 80° C. for 720 hours so as to examine the generation of defects, resulting in as shown in Table 2.

The quantity of expansion of the samples of the hardened resin obtained similarly were examined as the ink resistance by dipping them in ink, resulting in as shown in Table 2. The dipping conditions were as follows: a PCT was used filled with ink for Canon Bubble Jet Printer BJ10v and BJ330 at a temperature of 120° C. for 10 hours.

COMPARATIVE EXAMPLE 3

Recording heads were manufactured similarly to Example 4 except for a fact that the epoxy resin Epicoat 828 (manufactured by Yuka Shell) which was fluid at the room temperature was not used as the transfer-molding resin composition so as to examine the defective proportion and the ink resistance, resulting in as shown in Table 2.

EXAMPLE 5

Recording heads were manufactured similarly to Example 4 except for a fact that 15 parts of spheroidal silica filler FB-35 (manufactured by Denki Kagaku Kogyo and having an average particle size of 12 μm) were added at the time of manufacturing the B-stag epoxy resin so as to examine the defective proportion and the ink resistance, resulting in as shown in Table 2.

COMPARATIVE EXAMPLE 4

Recording heads were manufactured similarly to Example 4 except for a fact that the epoxy resin Epicoat 828 (manufactured by Yuka Shell) which was fluid at the room temperature was not used as the transfer-molding resin composition so as to examine the defective proportion and the ink resistance, resulting in as shown in Table 2.

and it was hardened. Then exposing and developing with heat were performed, and washing with an exclusive developer was performed so that a solid layer having a fluid passage pattern was formed.

The substrate on which the solid layer had been formed was interposed between an upper die and a lower die so that transfer molding process was performed to form the molded

TABLE 2

| Transfer-molding resin composition | 60° C. and a humidity of 90% | | In a dry atmosphere of In an atmosphere of 80° C. | | Samples were dipped in ink | | Result of inspection of |
|---|---|---|---|---|---|---|---|
| | 360 hours after | 720 hours after | 360 hours after | 720 hours after | BJ10V | BJ330 | initial defects |
| Example 4 | All of 20 heads were freed from defects | One of the 20 heads encountered a defect of the quality of the printed image due to separation of resin | All of 20 heads were freed from defects | All of 20 heads were freed from defects | 3.61% | 3.63% | All of the 20 heads were freed from defects |
| Example 5 | All of the 20 heads were freed from defects | All of the 20 heads were freed from defeats | All of the 20 heads were freed from defect | All of the 20 heads were freed from defects | 2.82% | 2.20% | One of the 20 heads encountered breakage of substrate at the time of cutting |
| Comparative Example 3 | One of the 20 heads encountered a problem of unsatisfactory quality of printed image due to separation of resin | Seven of the 20 heads encountered a problem of unsatisfactory quality of printed image due to separation of resin | Two of the 20 heads encountered a problem of unsatisfactory quality of printed image due to separation of resin | Five of the 20 heads encountered a problem of unsatisfactory quality of printed image due to separation of resin | 4.46% | 3.86% | One of the 20 heads encountered breakage of substrate at the time of cutting |
| Comparative Example 4 | One of the 20 heads encountered a problem of unsatisfactory quality of printed image due to separation of resin | Six of the 20 heads encountered a problem of unsatisfactory quality of printed image due to separation of resin | Three of the 20 heads encountered a problem of unsatisfactory quality of printed image due to separation of resin | Seven of the 20 heads encountered a problem of quality of printed image due to separation of resin | 4.20% | 3.71% | Five of the 20 heads encountered breakage of substrate at the time of cutting |

Then, examples in which a resin composition is used as the transfer-molding resin composition which contains an epoxy resin having a polysulfide skeleton as the main chain will now be described.

EXAMPLE 6

60 parts of Epicoat (trade name of Yuka Shell) serving as the epoxy resin, 10 parts of triglycidyl isocyanate (manufactured by Nissan Kagaku), and 30 parts of epoxy resin FLEP60 (trade name of Toray Thiocoal) were used to which 55 parts of tetrahydrophthalic anhydrice (manufactured by Shin-Nihon Rika) serving as the hardening agent and 1 part of curing catalyst (trade name 2E4MZ manufactured by Shikoku Kasei Kogyo) were added before they were mixed with one another while being heated and melted so as to allow the hardening reaction to proceed. As a result, a B-stage epoxy resin, which had been gelled at 130° C. for 45 seconds, was prepared. The resin thus-obtained was cooled to the room temperature, and then crushed and the tablet making process was performed so that an epoxy resin composition tablet was obtained.

Then, electricity-to-heat conversion members and aluminum electrodes were placed on the substrate made of glass. Then, a precise positive type plating resist was applied to the upper surface of the substrate to have a thickness of 30 μm, resin layer made of the resin composition. The molding condition were as follows: the previous heating temperature was 85° C., the injection pressure was 40 kgf/cm$^2$ the temperature of the die was 130° C., the time in which the resin was hardened under a predetermined pressure was 8 minutes and the post-curing process was performed.

After the molded resin layer had been formed, the recording head was dipped in acetone so that the solid layer was dissolved and removed. Hence, the ink jet recording head according to the present invention was obtained.

Then, the manufactured recording heads were allowed to stand in a high temperature and high humidity atmosphere of 60° C. and 90% for 360 hours and 720 hours so as to examine the defective proportion. Similarly, the defective proportion was examined after the recording heads were allowed to stand in a dry atmosphere at 80° C. The results of the examinations are shown in Table 1.

Furthermore, the ink resistance was evaluated by examining the quantity of expansion of hardened members of the resin composition which had been dipped in ink. The test was performed by using to types of ink; Canon Bubble Jet Printer BJ10V (trade name of Canon) and BJ330 (trade name of Canon) each of which was enclosed in PCTs at 120° C. for 10 hours, resulting as shown in Table 1.

COMPARATIVE EXAMPLE 5

An epoxy resin composed of 80 parts of Epicoat 1001 (manufactured by Yuka Shell) and 20 parts of triglycidyl isocyanate (manufactured by Nissan Kagaku) was used, and The resin composition thus obtained was used so that an ink jet recording head was manufactured similarly to Example 6, and the defective proportion and the ink resistance of the hardened resin were examined, resulting in as shown in Table 3.

TABLE 3

| Transfer-molding resin composition | In an atmosphere of 60° C. and a humidity of 90% | | In a dry atmosphere of 80° C. | | Quantity of expansion of hardened resin | | Results of inspection of initial defects |
| --- | --- | --- | --- | --- | --- | --- | --- |
| | 360 hours after | 720 hours after | 360 hours after | 720 hours after | BJ10V | BJ330 | |
| Example 6 | All of 20 heads were freed from defects | One of the 20 heads encountered a problem of unsatisfactory quality of printed image due to separation of resin | All of the 20 head were freed from defects | All of the 20 heads were freed from defects | 3.62% | 3.60% | All of the 20 heads were freed from defects |
| Example 7 | All of the 20 heads were freed from defeats | All of the 20 heads were freed from defects | All of the 20 heads were freed from defects | All of the 20 heads were freed from defects | 3.55% | 3.57% | All of the 20 heads were freed from defects |
| Comparative Example 5 | One of the 20 heads encountered a problem of unsatisfactory quality of printed image due to separation of resin | Seven of the 20 heads encountered a problem of unsatisfactory quality of printed image due to separation of resin | Two of the 20 heads encountered a problem of unsatisfactory quality of printed image due to separation of resin | Five of the 20 heads encountered a problem of unsatisfactory quality of printed image due to separation of resin | 4.46% | 3.86% | All of the 20 heads were freed from defects |

55 parts of tetrahydrophthalic anhydrice (manufactured by Shin-Nihon Rika) serving as its hardening agent, and 1 part of curing catalyst 2E4MZ (manufactured by Shikoku Kasei Kogyo) were added, and they were mixed with one another while being heated and melted so as to allow the hardening reaction of the epoxy resin to proceed so that the B-stage epoxy resin, which had been gelled at 130° C. for 40 seconds, was prepared. The resin thus-obtained was cooled to the room temperature, crushed and the tablet making process was performed, so that an epoxy resin composition tablet was obtained.

The resin composition thus obtained was used so that an ink jet recording head was manufactured similarly to Example 6, and the defective proportion and the ink resistance of the hardened resin were examined, resulting in as shown in Table 3.

EXAMPLE 7

An epoxy resin composed of 80 parts of Epicoat 1001 (manufactured by Yuka Shell) and 20 parts of triglycidyl isocyanate (manufactured by Nissan Kagaku) was used, and 55 parts of tetrahydrophthalic anhydrice (manufactured by Shin-Nihon Rika) serving as its hardening agent, and 1 part of curing catalyst 2E4MZ (manufactured by Shikoku Kasei Kogyo) were added, and they were mixed with one another while being heated and melted so as to allow the hardening reaction to proceed so that the B-stage epoxy resin, which had been gelled at 130° C. for 40 seconds, was prepared. The resin thus-obtained was cooled to the room temperature, and crushed. Then, 30 parts of epoxy resin FLEP60 (trade name of Tory Thiocoal), which has a polysulfide skeleton as the main chain and which was fluid at the room temperature were mixed with it, and then the tablet making process was performed so that an epoxy resin composition tablet was obtained.

Then, example in which the transfer-molding resin having a low glass transition point is used will now be described.

EXAMPLE 8

As the transfer-molding resin, epoxy resin composition tablet EME700 (manufactured by Sumitomo Bakelite and having a catalogue Tg value of 100° C.) was used so that an outer frame made of the hardened resin was formed by transfer molding on the substrate on which the device surface had been previously formed. The molding conditions were as follows: the previously heating temperature was 85° C., the injection pressure was 40 Kgf/cm$^2$ the molding temperature was 130° C. and the time in which the resin was hardened under a predetermined pressure was 8 minutes.

After the molding process has been completed, the ink jet recording head to be manufactured was cut at the position at which the ink discharge port would be formed, and then the solid layer was dissolved and removed so that the recording head according to the present invention was obtained.

Twenty recording heads were manufactured so as to examine the defective proportion. Furthermore, the defective proportion was examined after the twenty recording heads were allowed to stand in a high temperature and high humidity atmosphere of the temperature of 60° C. and the humidity of 90% so as to examine the defective proportion, resulting is as shown in Table 4.

Furthermore, the glass transition point Tg of the hardened resin was measured by a kinetic viscosity and elasticity tester, resulting in as shown in Table 4.

COMPARATIVE EXAMPLE 6

The recording heads were manufactured similarly to Example 8 except for the facts that epoxy resin composition tablet EME-750 (manufactured by Sumitomo Bakelite and having a catalogue Tg value of 170° C.) was used as the transfer-molding resin, and the molding conditions were changed as follows:

Transfer molding conditions
Previously heating temperature: 85° C.
Injection pressure: 40 Kgf/cm²
Molding temperature: 160° C.
Time in which resin was hardened under predetermined temperature: 5 minutes Then, the defective proportion and Tg of the hardened resin were tested, resulting in as shown in Table 4.

EXAMPLE 9

Recording heads were manufactured similarly to Example 8 except for the facts that epoxy resin composition tablet NT-8526 (manufactured by Nitto Denko and having a measured Tg of 140° C.) was used as the transfer-molding resin and the molding conditions were changed as follows:

Transfer molding conditions
Previously heating temperature: 85° C.
Injection pressure: 40 Kgf/cm²
Molding temperature: 130° C.
Time in which resin was hardened under predetermined temperature: 8 minutes Then, the proportion of the defects and Tg of the hardened resin were examined, resulting in as shown in Table 4.

COMPARATIVE EXAMPLE 7

Recording heads were manufactured similarly to Example 8 except for the facts that the transfer-molding resin was composed of a material obtained by mixing 30 parts of epoxy diluted agent ED-506 (manufactured by Asahi Denka Kogyo and measured Tg of the hardened resin thereof was 59° C.) with epoxy resin composition tablet NT-8526 (manufactured by Nitto Denko) and the molding conditions were as follows:

Transfer molding conditions
Previously heating temperature: 85° C.
Injection pressure: 40 Kgf/cm²
Molding temperature: 130° C.
Time in which resin was hardened under predetermined temperature: 10 minutes Then, the proportion of detection and Tg of the hardened resin were examined, resulting in as shown in Table 4.

EXAMPLE 10

Recording heads were manufactured similarly to Example 8 except for the facts that the transfer-molding resin was composed of a material obtained by mixing 30 parts of epoxy diluted agent ED-501 (manufactured by Asahi Denka Kogyo and measured Tg of the hardened resin thereof was 60° C.) with epoxy resin composition tablet NT-8526 (manufactured by Nitto Denko) and the molding conditions were as follows:

Transfer molding conditions
Previously heating temperature: 85° C.
Injection pressure: 40 Kgf/cm²
Molding temperature: 130° C.
Time in which resin was hardened under predetermined temperature: 8 minutes Then, the proportion of detection and Tg of the hardened resin were examined, resulting in as shown in Table 4.

TABLE 4

| Transfer-molding resin composition | Results of inspections of initial defects | Results of inspections of initial defects after samples had been allowed to stand at 60° C. and 90% humidity for 720 hours | Tg obtained from peak of tan δ |
| --- | --- | --- | --- |
| Example 8 | All of the 20 heads were freed from defects | One of the 20 heads encountered a problem of unsatisfactory quality of printed image due to separation of resin | 127° C. |
| Comparative Example 6 | Two of the 20 heads encountered a problem of breakage of substrate at the time of molding the head Three of the 20 heads encountered a problem of breakage of substrate at the time of cutting | Five of the 20 heads encountered a problem of unsatisfactory quality of printed image due to separation of resin | 162° C. |
| Example 9 | One of the 20 heads encountered a problem of breakage of substrate at the time of cutting | One of the 20 heads encountered a problem of unsatisfactory quality of printed image due to separation of resin | 140° C. |
| Comparative Example 7 | All of the 20 heads were freed from defects | Nine of the 20 heads encountered a problem of unsatisfactory quality of printed image due to separation of resin | 59° C. |
| Example 10 | All of the 20 heads were freed from defects | One of the 20 heads encountered a problem of unsatisfactory quality of printed image due to separation of resin | 60° C. |

The present invention enables an excellent effect to be obtained in the case where it is adapted to a recording head or a recording apparatus among a variety of ink jet recording methods of a type which records information by forming a flying fluid droplet by utilizing heat energy.

Its typical structure and principle have been disclosed in, for example, U.S. Pat. Nos. 4,723,129 and 4,740,796. It is preferable to embody the present invention by using the aforesaid basic principle. The aforesaid recording method can be adapted to both a socalled on-demand type apparatus and continuous type apparatus.

The aforesaid recording method will now be described briefly. One or more drive signals are applied to an electricity-to-heat Conversion member disposed to face a sheet or a fluid passage which holds fluid (ink) so as to, in accordance with information to be recorded, raise the temperature of the fluid (ink) to a level which exceeds the nuclear boiling phenomenon or which causes the nuclear boiling phenomenon to take place, so that heat energy is generated and film boiling is caused to take place in the heat acting surface of the recording surface. Since the bubble can be formed corresponding to the drive signal given to the electricity-to-heat conversion member as described above, the aforesaid recording method can be effectively adapted to the on-demand type recording method. The enlargement and the contraction of the bubble cause the fluid (ink) to be discharged through the discharge port so that one or more droplet are formed. It is further preferable to employ a pulse drive signal in this case because the bubble can be adequately enlarged and contracted and therefore the fluid (ink) can responsively be discharged. It is preferable that the pulse drive signal be a signal of the type disclosed in U.S. Pat. Nos. 4,463,359 and 4,345.262. The adaption of the conditions for raising the temperature of the heat acting surface and disclosed in U.S. Pat. No. 4,313,124 will enable further satisfactorily recording to be performed.

As for the structure of the recording head, the present invention includes the aforesaid structure disclosed in each of the U.S. patents in which the discharge port, the fluid passage and the electricity-to-heat conversion member are combined with one another (the straight fluid passage or the perpendicular fluid passage), and a structure disclosed in U.S. Pat. Nos. 4,558,333 and 4,459,600 in which the heat acting portion is disposed in a bent portion.

The present invention can be effectively adapted to a structure disclosed in Japanese Patent Application Laid-Open No. 59-123670 in which a common slit is used as the discharge port of a plurality of electricity-to-heat conversion members and to a structure disclosed in Japanese Patent Application Laid-Open No. 59-138461 in which an opening for absorbing pressure waves of heat energy is disposed to face the discharge portion.

Furthermore, the present invention can be effectively adapted to a recording head of a full line type having the same length as the maximum width of the recording medium which can be recorded by the recording apparatus. The full line head may be a type disclosed in the aforesaid specifications and constituted by combining a plurality of recording heads or a type which has an integrally formed recording head.

The present invention can also effectively be adapted to a recording head of an interchangeable chip type which can be electrically connected to the body of the apparatus and to which ink can be supplied from the body of the apparatus, or to a recording head of a cartridge type which is integrally formed with the recording head.

It is preferable that recording head restoring means and/or an auxiliary means be added to the recording apparatus according to the present invention because the recording apparatus according to the present invention can be further stabled. Specifically, it is preferable to add recording head capping means, cleaning means, pressuring means or sucking means, an electricity-to-heat conversion member or another heating device or a sub-heating means constituted by combining them and means for performing subdischarge mode which performs an individual discharge operation from the recording operation.

The present invention can effectively be adapted to an apparatus having a mode in which an image of a main color such as black is recorded and a mode in which an image of a plurality of combined colors is recorded and/or a mode in which a full color image is recorded by mixing colors by arranging the structure in such a manner that an integrated recording head is employed or that a plurality of recording heads are combined.

Although the aforesaid embodiments of the present invention use liquid ink, ink in a solid state at the room temperature or ink which is softened at the room temperature may be used. Since the aforesaid ink jet apparatus is arranged in such a manner that the temperature of the ink is controlled to be included by the range from 30° C. to 70° C. so as to make the viscosity of the ink to be included by a stable discharge range, the necessity lies in that the ink is formed into liquid at the time of applying the employed recording signal.

Ink of a type, which positively prevents an excessive rise of the temperature of the head and/or the ink due to heat energy by utilizing the heat energy as phase change energy from the solid state to the fluid state, may be used, or ink of a type may be used which is solidified in a state where the ink is allowed to stand for the purpose of preventing evaporation of the ink. The present invention may use ink of a type which is liquidized when heat energy is supplied, for example, ink may be used which is liquidized when heat energy is supplied in response to the recording signal so that fluid ink is discharged and ink the solidification of which is commenced when it reaches the recording medium may be used.

The ink of the aforesaid type may be formed into fluid or solid which is held in a recess or a through hole of a porous sheet at a position at which the ink faces the electricity-to-heat conversion member as disclosed in Japanese Patent Application Laid-Open No. 54-56847 or Japanese Patent Application Laid-Open No. 60-71260.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An ink jet recording head comprising a fluid passage constituted by forming, on a substrate, an outer frame made of a hardened resin obtained by transfer molding, wherein a transfer-molding resin composition which is a material of said hardened resin is composed of an epoxy resin, a hardening agent, an agent for enhancing hardening and a filler, and an amount of said filler is in a range from 0.5 to 17.0 wt. %.

2. An ink jet recording head according to claim 1, wherein said hardened resin is a transparent resin.

3. An ink jet recording head comprising ink discharge ports for discharging ink, a fluid passage for introducing the ink to said discharge ports, and energy generating devices for supplying ink discharging energy to the ink present in said fluid passage, said fluid passage constituted by forming, on a substrate, an outer frame made of a hardened resin obtained by transfer molding, wherein a transfer-molding resin composition which is a material of said hardened resin is composed of an epoxy resin, a hardening agent, an agent for enhancing hardening and a filler, and an amount of said filler is in a range from 0.5 to 17.0 wt. %.

4. An ink jet recording head according to claim 3, wherein said hardened resin is a transparent resin.

5. An ink jet recording head according to 3 or 4, wherein said energy generating devices are electricity-to-heat conversion members each of which generates heat upon receiving electric energy causing the ink to undergo a phase change and to be discharged.

6. An ink jet recording head according to claims 3 or 4, wherein said ink jet recording head is a full-line type recording head having a plurality of said ink discharge ports disposed to cover an overall width of a recording region of a recording medium.

7. An ink jet recording head comprising:

an energy generating element for generating energy utilized for discharging ink, a substrate having said energy generating element, a discharge port for discharging ink, an ink flow path communicating with said discharge port to supply ink and an outer frame having a groove to be formed to said ink flow path and defining said ink flow path by being jointed to said substrate, wherein said outer frame is formed by transfer molding with a solid layer comprising a soluble resin provided at a portion corresponding to said ink flow path on said substrate as a part of a mold which is cured, wherein a transfer molding resin constituting said outer frame includes a filler agent of from 0.5–17.0 wt %.

8. An ink jet recording head comprising a fluid passage constituted by forming, on a substrate, an outer frame made of a hardened resin obtained by transfer molding, wherein a transfer-molding resin composition which is a material of said hardened resin is a resin composition obtained by mixing an epoxy resin, which is fluid at room temperature, with a B-stage epoxy resin composition at least composed of an epoxy resin, a hardening agent, and an agent for enhancing hardening.

9. An ink jet recording head according to claim 8, wherein an amount of an epoxy main component contained by said transfer-molding resin is larger than an amount of said hardening agent.

10. An ink jet recording head having ink discharge ports for discharging ink, a fluid passage for introducing the ink to said discharge ports, and energy generating devices for supplying ink discharging energy to the ink present in said fluid passage, said fluid passage constituted by forming, on a substrate, an outer frame made of a hardened resin obtained by transfer molding, wherein a transfer-molding resin composition which is a material of said hardened resin is a resin composition obtained by mixing an epoxy resin, which is fluid at room temperature, with a B-stage epoxy resin composition at least composed of an epoxy resin, a hardening agent, and an agent for enhancing hardening.

11. An ink jet recording head according to claim 10, wherein an amount of an epoxy main component contained by said transfer-molding resin is larger than an amount of said hardening agent.

12. An ink jet recording head according to claims 11 or 35, wherein said ink discharging energy generating devices are electricity-to-heat conversion members each of which generates heat upon receiving electric energy causing the ink to undergo a phase change and to be discharged.

13. An ink jet recording head according to claims 11 or 35, wherein said ink jet recording head is a full-line type recording head having a plurality of said ink discharge ports disposed to cover an overall width of a recording region of a recording medium.

14. An ink jet recording head comprising:

an energy generating element for generating energy utilized for discharging ink, a substrate having said energy generating element, a discharge port for discharging ink, an ink flow path communicated with said discharge port to supply ink and an outer frame having a groove to be formed to said ink flow path and defining said ink flow path by being jointed to said substrate, wherein said outer frame is formed by transfer molding with a solid layer comprising a soluble resin provided with a portion corresponding to said ink flow path on said substrate as a part of a mold which is cured, wherein a transfer molding resin constituting said outer frame includes at least an epoxy resin having a polysulfide skeleton as a main chain.

15. A recording apparatus comprising:

an ink jet recording head having ink discharge ports for discharging ink, a fluid passage for introducing the ink to said discharge ports, and energy generating devices for supplying ink discharging energy to the ink present in said fluid passage, said fluid passage constituted by forming, on a substrate, an outer frame made of a hardened resin obtained by transfer molding, wherein a transfer-molding resin composition which is a material of said hardened resin is a resin composition obtained by mixing an epoxy resin, which is fluid at room temperature, with a B-stage epoxy resin composition at least composed of an epoxy resin, a hardening agent, and an agent for enhancing hardening; and a member on which said head is mounted.

16. An ink jet recording apparatus according to claim 15, wherein an amount of an epoxy main component contained by said transfer-molding resin is larger than an amount of said hardening agent.

17. A recording apparatus comprising:

an ink jet recording head comprising ink discharge ports for discharging ink, a fluid passage for introducing the ink to said discharge ports, and energy generating devices for supplying ink discharging energy to the ink present in said fluid passage, said fluid passage constituted by forming, on a substrate, an outer frame made of a hardened resin obtained by transfer molding, wherein a transfer-molding resin composition which is a material of said hardened resin is composed of an epoxy resin, a hardening agent, an agent for enhancing hardening and a filler, and an amount of said filler is in a range from 0.5 to 17.0 wt. %; and a member on which said head is mounted.

18. An ink jet recording apparatus according to claim 17, wherein said hardened resin is a transparent resin.

* * * * *

UNITED STATES PATENT AND TRADEMARK OFFICE
CERTIFICATE OF CORRECTION

PATENT NO. : 5,510,818
DATED : April 23, 1996
INVENTOR(S) : Akihiko SHIMOMURA, ET AL.

It is certified that error appears in the above-indentified patent and that said Letters Patent is hereby corrected as shown below:

ON THE COVER PAGE:
Item [56]
Under "FOREIGN PATENT DOCUMENTS":

```
"1259959   10/1989   Japan
 2168635    8/1990   Japan
 4090356    3/1992   Japan
 4090355    3/1992   Japan"  should read --1-259959  10/1989  Japan
  2-168635   8/1990  Japan
  4-090356   3/1992  Japan
  4-090355   3/1992  Japan--.
```

COLUMN 1:

Line 28, "manufactured" should read --manufactured by--.

COLUMN 2:

Line 36, "ms" should read --is--; and
Line 65, "separate" should read --separation--.

COLUMN 3:

Line 49, "Also" should read --Also,--.

UNITED STATES PATENT AND TRADEMARK OFFICE
CERTIFICATE OF CORRECTION

PATENT NO. : 5,510,818
DATED : April 23, 1996
INVENTOR(S) : Akihiko SHIMOMURA, ET AL.

Page 2 of 5

It is certified that error appears in the above-indentified patent and that said Letters Patent is hereby corrected as shown below:

COLUMN 6:

Line 41, "waster" should read --water--; and
Line 55, "diesing" should read --dicing--.

COLUMN 7:

Line 23, "0.5%" should read --0.5%,--;
Line 54, "gell," should read --gel,--; and
Line 66, "joint" should read --point--.

COLUMN 8:

Line 19, "resistance:" should read --resistance--;
Line 37, "anhydrice" should read --anhydride--; and
Line 57, "And" should read --and--.

COLUMN 9:

Line 40, "defeats" should read --defects--.

COLUMN 10:

Line 9, "anhydrice" should read --anhydride--; and
Line 15, "thus-obtained" should read --thus obtained,--.

UNITED STATES PATENT AND TRADEMARK OFFICE
CERTIFICATE OF CORRECTION

PATENT NO. : 5,510,818  
DATED : April 23, 1996  
INVENTOR(S) : Akihiko SHIMOMURA, ET AL.

Page 3 of 5

It is certified that error appears in the above-indentified patent and that said Letters Patent is hereby corrected as shown below:

COLUMN 11:

Table 2, "60° C. and a humidity of 90%" should read --In an atmosphere of 60° C. and a humidity of 90%--;

Table 2, "In a dry atmosphere of
    In an atmosphere of 80° C." should read
--In a dry atmosphere of 80° C.--;

Table 2, "defeats" should read --defects--; and

Line 52, "anhydrice" should read --anhydride--.

COLUMN 12:

Line 64, "to" should read --two--.

COLUMN 13:

Table 3, "defeats" should read --defects--;
Line 31, "anhydrice" should read --anhydride--; and
Line 54, "anhydrice" should read --anhydride--.

COLUMN 14:

Line 58, "is" should read --in--.

COLUMN 16:

Line 50, "socalled" should read --so-called--; and
Line 54, "Conversion" should read --conversion--.

UNITED STATES PATENT AND TRADEMARK OFFICE
CERTIFICATE OF CORRECTION

PATENT NO. : 5,510,818
DATED : April 23, 1996
INVENTOR(S) : Akihiko SHIMOMURA, ET AL.

It is certified that error appears in the above-indentified patent and that said Letters Patent is hereby corrected as shown below:

COLUMN 17:

Line 1, "droplet" should read --droplets--;
Line 6, "4,345.262." should read --4,345,262.--, and "adaption" should read --adoption--;
Line 9, "satisfactorily" should read --satisfactory--; and
Line 47, "subdischarge" should read --sub-discharge--.

COLUMN 18:

Line 21, "particularly," should read --particularity,--; and
Line 54, "to 3 or 4," should read --to claims 3 or 4,--.

COLUMN 19:

Line 42, "claims 11 or 35," should read --claims 10 or 11,--; and

UNITED STATES PATENT AND TRADEMARK OFFICE
CERTIFICATE OF CORRECTION

PATENT NO. : 5,510,818
DATED : April 23, 1996
INVENTOR(S) : Akihiko Shimomura, et al It is certified that error appears in the above-indentified patent and that said Letters Patent is hereby corrected as shown below:

Column 19, line 47, "claims 11 or 35," should read --claims 10 or 11,--.

Signed and Sealed this

Thirty-first Day of December, 1996

Attest:

BRUCE LEHMAN

Attesting Officer    Commissioner of Patents and Trademarks